United States Patent [19]
Pellerin et al.

[11] 4,245,737

[45] Jan. 20, 1981

[54] APPARATUS FOR TRANSFERRING MATERIALS SUBMERGED IN A LIQUID ABOVE THE FREE SURFACE OF SAID LIQUID

[75] Inventors: Achille Pellerin, Bagnols sur Ceze; Jacques Penen, Avignon, both of France

[73] Assignee: Commissariat a l'Energie Atomique, Paris, France

[21] Appl. No.: 50,290

[22] Filed: Jun. 20, 1979

[30] Foreign Application Priority Data

Jun. 30, 1978 [FR] France ................................ 78 19623

[51] Int. Cl.$^3$ ........................ B65G 27/02; B65G 27/16

[52] U.S. Cl. ...................................... 198/756; 198/766

[58] Field of Search ................ 198/756, 766; 210/521, 210/513, 519

[56] References Cited

U.S. PATENT DOCUMENTS

| | | | |
|---|---|---|---|
| 2,760,503 | 8/1956 | Carrier, Jr. | 198/756 |
| 2,985,281 | 5/1961 | Carrier, Jr. | 198/756 |

FOREIGN PATENT DOCUMENTS

| | | | |
|---|---|---|---|
| 505603 | 9/1976 | U.S.S.R. | 198/756 |

*Primary Examiner*—Joseph E. Valenza
*Assistant Examiner*—Brian Bond
*Attorney, Agent, or Firm*—Sughrue, Rothwell, Mion, Zinn and Macpeak

[57] ABSTRACT

A vertical helical conveyor for conveying radioactive materials submerged in water to a discharge point above the surface of the water. The conveyor is partially immersed in the water and consists of a helical fin fixed between an inner vertical shaft and an outer vertical tube. Helical vibratory motion is applied to the inner shaft to convey the waste material upwardly through the water to a discharge port above the surface of the water. A ferrule extends the lower end of the tube beyond the lower end of the shaft to define a space below the lower end of the helical fin. A compressed air pipe is located inside the shaft and extends from a point above the surface of the water to a point just below the closed end of the shaft into the space defined by the ferrule. Supplied to the upper end of the air pipe is compressed air of just sufficient pressure to form and maintain in the space an air cushion in the form of a bubble.

4 Claims, 1 Drawing Figure

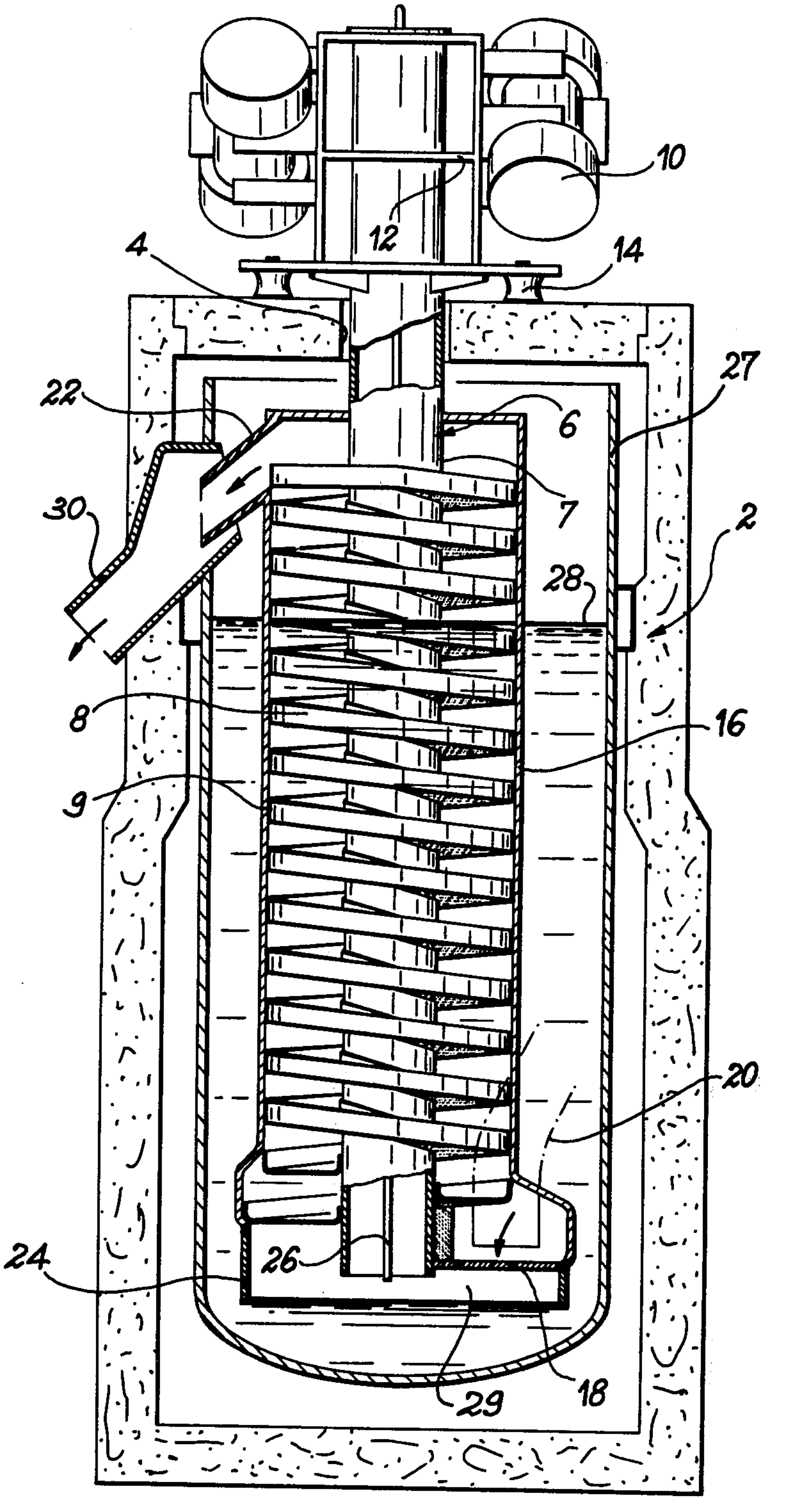
10
12
4
14
22
6
27
7
30
2
28
8
16
9
20
24
26
29
18

APPARATUS FOR TRANSFERRING MATERIALS SUBMERGED IN A LIQUID ABOVE THE FREE SURFACE OF SAID LIQUID

BACKGROUND OF THE INVENTION

The present invention relates to an apparatus for transferring materials submerged in a liquid above the free surface of said liquid.

More specifically it relates to an apparatus for the transfer of radioactive waste stored at the bottom of a pond for the purpose of introducing this waste into a reprocessing installation.

For the transfer of materials in air it is known to use apparatus comprising a shaft fixed to a helical fin and means for vibrating the shaft and its fin, said means generally being fixed to the lower part of the shaft.

More specifically in such apparatus the helical fin performs a helical reciprocating movement in such a way as to ensure the upward movement of the materials to be transferred.

Such apparatus has the disadvantage of not being suitable for the transfer of materials into an incompressible high density medium, such as a liquid.

In such a medium it is necessary to use a fin whose rigidity is sufficient to withstand without bending the mechanical stresses produced by the resistance of the medium to the vertical component of the reciprocating movement of the fin. However, the use of such a fin makes it necessary for the means to have a high electrical supply power to vibrate the fin.

BRIEF SUMMARY OF THE INVENTION

The object of the present invention is to provide an apparatus permitting the transfer of materials submerged in a liquid above the surface of said liquid without requiring a high electrical power.

According to the invention this object is achieved by an apparatus which comprises:

a shaft fixed to a helical fin and which is maintained partly submerged in the liquid, whilst one of the ends of the fin is located above the free surface of the liquid;

means for transmitting a helical reciprocating movement to the said shaft, said means being positioned above the free surface of the liquid;

a tube of the same axis as the shaft and fixed by its inner wall to the free edge of the fin and by its upper edge to the shaft;

a ferrule extending the lower end of the tube beyond the lower end of the shaft;

means for supplying the material into the lower part of the tube which is filled with liquid;

means for discharging said materials at the upper part of the tube;

means for supplying compressed air to the space within the ferrule below the fin.

The apparatus as defined hereinbefore takes advantage of the presence of the tube and the provision at the bottom of said tube of an air cushion in the ferrule and which contains the lower part of the fin.

The two latter means make it possible to transmit to the fin assembly a helical vibrating movement by significantly reducing the resistance of the liquid to the vertical translation displacements of the fin and by stiffening the latter.

Thus, the apparatus according to the invention makes it possible to ensure the transfer of materials through a liquid without producing unacceptable mechanical stresses in the fin and without requiring a high electric power.

According to the invention the means for supplying the materials to the lower part of the tube comprise a flat wall connected to the shaft and to the tube, said wall being located in the vicinity of the lower end of the fin and a pipe for supplying materials to the wall and means for supplying materials to the pipe.

Moreover the means for supplying compressed air to the space within the ferrule comprise a pipe located within the shaft and connected by its upper end to a compressed air supply device. The pressure of the said air is chosen so that it is just sufficient to make it possible to create a cushion in the form of a "bubble" in the lower ferrule in the manner of a diving bell, i.e. just sufficient to balance the water pressure above it.

DESCRIPTION OF THE DRAWING AND PREFERRED EMBODIMENTS

Other features and advantages of the present invention can be gathered more clearly from the following descripton of an embodiment of the apparatus according to the invention which serves to remove radioactive waste from the water of a pond for supplying a pipe which can constitute the supply pipe of an installation for the reprocessing of radioactive waste, whereby the latter may for example comprise irradiated graphite and magnesium waste from the fuel cells of a nuclear reactor. The description is provided with reference to the attached drawing which shows in vertical section the transfer apparatus according to the invention.

With reference to the drawing it can be seen that the apparatus according to the invention is in part contained in a biological protection enclosure constituting the support frame of the apparatus, the latter being mounted through an opening 4 provided in the upper wall of enclosure 2. Tank 27 within enclosure 2 contains a liquid for the storage of not shown solid waste, said liquid generally being water, whose level is shown at 28.

As shown in the drawing the apparatus according to the invention comprises a shaft 6 having a vertical axis and fixed by part of its outer wall 7 located within the enclosure 2 to a helical fin 8 and by its upper end to a chassis 12 by means of which the shaft is supported by enclosure 2 and coupled to motors 10 which give it a helical reciprocating movement. The term helical reciprocating movement is understood to mean a movement whose alternately upward and downward translation components are very small (at the most a few millimeters) and whose rotations, alternately to the right and left are also of very limited amplitudes (max. one angular degree in the preferred embodiment of the invention) whereby said movement, which takes place at a frequency of 1500 per minute is reduced to a vibration which is scarcely visible to the eye. It should be noted that chassis 12 is mounted on enclosure 2 by means of shock absorbers 14 (enclosure 2 supports shaft 6).

With reference to the drawing it should be noted that a tube 16 of the same axis as shaft 6 is fixed to the outer edge 9 of the helical fin 8, whilst the upper edge of tube 16 is connected to shaft 6.

Furthermore, according to another essential feature of the invention, tube 16 is extended at its lower end by a ferrule 24, whose lower free edge is located at a level below that of the lower end of shaft 6, the space defined by ferrule 24 at the bottom of tube 16 below fin 8 and which remains in the liquid serving to provide a compressed air cushion contained in space 29. To this end a pipe 26 for supplying compressed air to the space within ferrule 24 is positioned within shaft 6 and is connected by its upper end to a compressed air supply system (not shown in the drawing).

It should also be noted that the lower part of tube 16 is provided with a pipe 20 for introducing waste material the pipe opening above a flat or planar wall 18 which receives the waste to be discharged and which is fixed to shaft 6 and to tube 16. The upper part of tube 16 is provided with a chute 22 for discharging the waste into a pipe 30 which leads to the outside. Obviously pipe 20 issues into the liquid in which the waste is permanently immersed.

It is pointed out that the waste introduction pipe 20 is inclined in such a way that the waste flows out of it by gravity after being introduced into it by any appropriate means.

An apparatus according to the invention in accordance with the description provided hereinbefore can have the following constructional parameters:

water level in enclosure 2: 2m
diameter of tube 16: 60cm
compressed air pressure at the bottom of tube 16: 200g
number of pulsations per second of shaft 6 and its fin 8: 25
time taken by the waste to traverse all the fins: 10 min.

The apparatus according to the invention as described hereinbefore functions in the following manner.

Once given a helical vibrating movement by motors 10, the helical fin 8 transmits to the radioactive waste, supplied to wall 18 by pipe 20, in the vicinity of its lower end the movement necessary for raising the waste through tube 16 and up to the discharge pipe 22.

In order that each of the points of the helical fin 8 effects a helical vibrating movement, tube 16 on the one hand ensures a stiffening of the fin by mechanically connecting each of its turns and on the other hand prevents any pulsation of the volume of water outside tube 16 in such a way that the latter offers no resistance to the vertical component of the helical movement of the fin.

Moreover the air cushion created and maintained (substantially without any flow by pipe 26 because it is merely necessary to compensate possible leaks) within the ferrule 24 between the liquid and the bottom of the helical fin is compressed and decompressed for each vertical displacement of the fin as a result of the upward and downward translation movements thereof. This prevents any significant energetic linkage between the fin and the liquid located in its lower part which could otherwise, particularly as a result of a pumping effect, oppose the regular transfer of solid waste in the liquid towards the surface and would cause a significant and prejudicial efflux of energy. Thus, only a small amount of energy is required to raise the radioactive waste from pipe 20 to discharge pipe 22 and the mechanical stresses produced in the helical fin are acceptable.

The invention is not limited to the embodiments described and represented hereinbefore and various modifications can be made thereto without passing beyond the scope of the invention.

What is claimed is:

1. An apparatus for transferring materials submerged in a liquid above the free surface of said liquid, wherein the apparatus comprise:

a vertical shaft which has its outer wall fixed to the inner edge of a helical fin and which is maintained partly submerged in the liquid, whilst the upper end of the fin is located above the free surface of the liquid;

means for transmitting a helical reciprocating movement to the shaft, said means being positioned above the free surface of the liquid;

a vertical tube of the same axis as, and surrounding, the shaft and fixed by its inner wall to the free outer edge of the fin and by its upper end to the shaft;

a ferrule extending the open lower end of the tube beyond the lower end of the shaft;

means for supplying the materials into the lower part of the tube which is filled with liquid;

means for discharging said materials at the upper part of the tube; and means for supplying compressed air to the space within the ferrule below the fin to create and maintain an air cushion in the form of a bubble.

2. A transfer apparatus according to claim 1, wherein the means for supplying the materials to the lower part of the tube comprises a flat wall connected to the shaft and to the tube, a pipe for supplying the materials to the said wall and means for supplying materials to the said pipe.

3. A transfer apparatus according to claim 1, wherein the means for supplying compressed air to the space within the ferrule comprises a pipe located within said shaft and connected by its upper end to a compressed air supply device, its lower end opening into the space below the helical fin.

4. An apparatus according to claim 1 wherein the materials are radioactive waste at the bottom of a pond.

* * * * *